Figure 1:
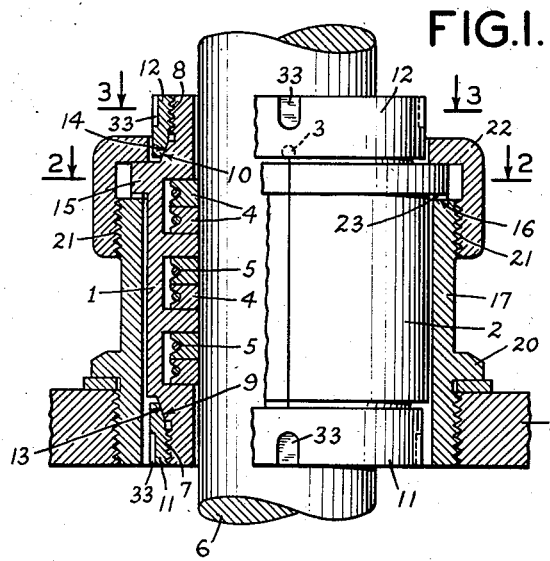

March 25, 1958    M. DEVENTER    2,828,149
STUFFING BOX WITH A SPLIT INTERNAL SLEEVE MEMBER
Filed Aug. 4, 1954

INVENTOR
MAX DEVENTER
BY
HIS ATTORNEYS

United States Patent Office 2,828,149
Patented Mar. 25, 1958

2,828,149

STUFFING BOX WITH A SPLIT INTERNAL SLEEVE MEMBER

Max Deventer, Allendorf, near Marburg, Germany

Application August 4, 1954, Serial No. 447,849

5 Claims. (Cl. 286—20)

This invention relates to certain improvements in or relating to stuffing boxes of the type having a split bipartite sleeve member.

It is an object of the present invention to provide a stuffing box of the type referred to having a relatively short length and occupying small space.

Another object of the invention is to provide a stuffing box in which the semi-circular sleeve members do not warp or get leaky.

Still another object of the invention is to provide a stuffing box in which the semi-circular sleeve members can have large tolerances.

With these and further objects in view, according to the present invention the pair of semi-circular sleeve members intended to enclose the packing are tightly arranged in a box portion of the stuffing box; the two ends are contracted in a radial direction and provided with external thread and with a conical or bulbed surface for compression by an annular nut member provided with an internal conical or bulbed counter surface. The semi-circular sleeve members may be provided with centering pins and with an annular flange which is preferably sealed by a resilient packing and engages the upper end face of the box portion of the stuffing box, and may be secured in the pressure cylinder by a cap nut threadably engaged with an external thread of the box portion of the stuffing box and embracing the annular flange.

In order to secure the semi-circular sleeve members against mutual displacement, they are provided with centering pins engaging in both members. They are formed with external thread and with a conical or bulbed surface on both ends and are compressed by means of an annular nut member having a complementary female thread and a complementary conical or spherical surface which faces the conical or spherical surface of the semi-circular sleeve member. In order to ensure a reliable seal and to facilitate the finishing, it is advisable to provide conical surfaces on the semi-circular sleeve member cooperating with bulbed counter surfaces on the annular nut members. In order to make the pressure medium contribute to the packing effect, the semi-circular sleeve members are provided at their outer ends with an annular flange which is packed on the end face of the box portion of the stuffing box by means of a resilient, elastic or plastic packing.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 4:
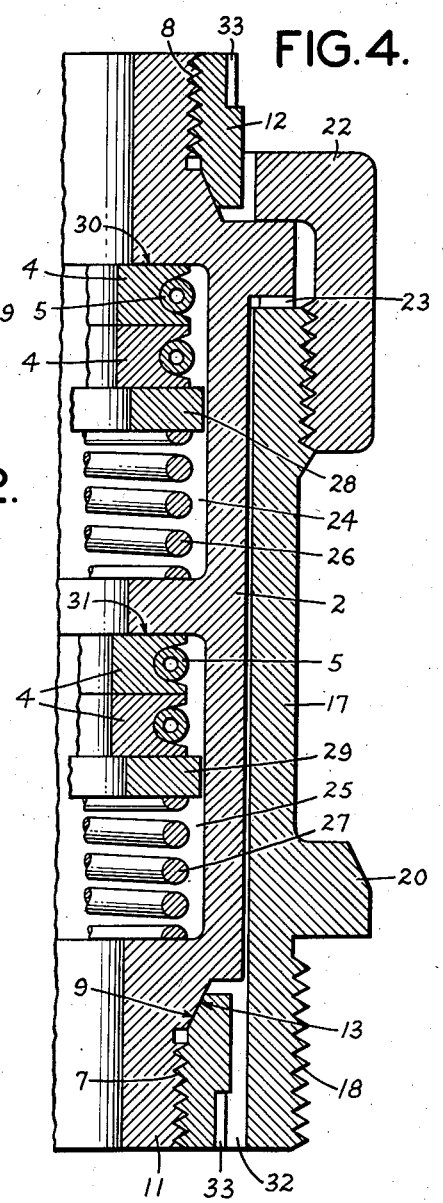
Figure 2:
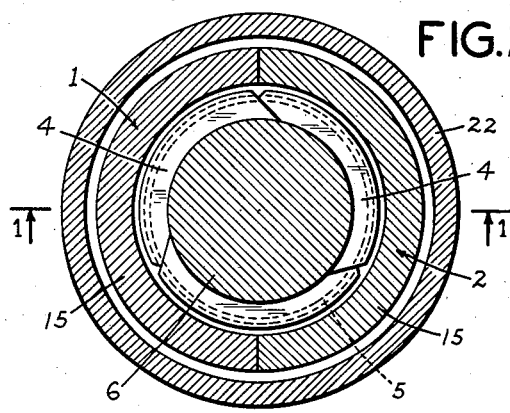
Figure 3:
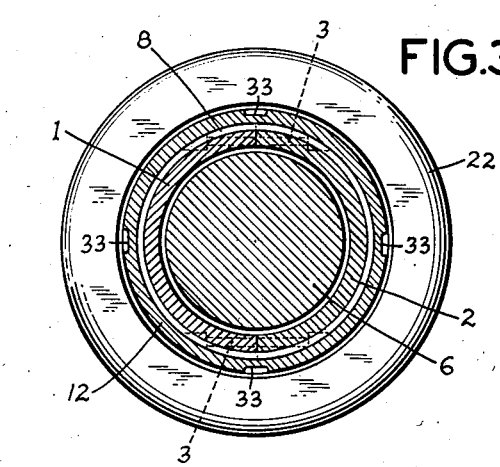

Fig. 1 is a fragmentary section on the line I—I in Fig. 2 of a stuffing box having the invention applied thereto, with metal ring packing for sealing against steam and other gaseous fluids under pressure, Fig. 2 is a section on line II—II in Fig. 1, Fig. 3 is a section on line III—III in Fig. 1, and Fig. 4 is a longitudinal section of a modified form of the stuffing box of Fig. 1 for water and other liquid fluids under pressure.

Similar reference numerals denote similar parts in the different views.

Referring now to the drawings in greater detail, and first to Figs. 1 to 3, it will be seen that the stuffing box comprises two semi-circular sleeve members 1 and 2 which are aligned to form a tubular sleeve by means of centering pins 3. A suitable packing is mounted in the sleeve and may consist of split rings 4 of cast iron or non-ferrous metals held together by helical springs 5. The packing receives and tightly encloses a movable machine part, for example, a piston rod 6. Each of the semi-circular sleeve members 1 and 2 is provided with an external thread 7 or 8 and with a conical or bulbed surface 9 and 10 at each end. Annular nut members 11, 12 are screwed onto the threads 7, 8, to hold the sleeve member in assembled relation. Each nut member has an internal conical surface 13 and 14, respectively, so that the semi-circular sleeve members 1, 2 are pressed tightly against each other when the annular nut members 11 and 12 are tightened. The marginal grooves 33 serve to facilitate tightening and loosening of the annular nut members 11, 12.

Each of the semi-circular sleeve mmebers 1, 2 has an annular flange 15 adjacent to one end engaging the end face 16 of a neck or box portion 17 of the stuffing box. A male thread 18 on the box portion 17 enables it to be screwed into the bore in a cylinder head 19 or the like to bring an annular flange 20 on the box portion into tight engagement with the cylinder head. The neck portion 17 of the stuffing box has a male thread 21 at its opposite end for receiving a cap nut 22 embracing the flange 15. Inserted between the seating surface of the annular flange 15 and the upper end face 16 of the neck portion 17 of the stuffing box is a resilient packing 23 of asbestos, lead, soft iron or the like, so that the space around the semi-circular sleeve members 1 and 2 is sealed to the outside.

The embodiment shown in Fig. 4, intended for liquid fluids, such as water, is similar to the construction described with reference to Figs. 1 to 3 except that chambers 24 and 25 are provided for the reception of compression springs 26, 27 urging the packing rings 4 against a stationary shoulder 30, 31, through axially shiftable pressure rings 28, 29.

It is important that the pressure fluid in all cases is permitted to enter behind the semi-circular sleeve members 1, 2 into the pressure space 32 up to the packing 23, so that the semi-circular sleeve members are uniformly pressed against each other.

According to the present invention soft packing can be replaced by metal packings 4 in a stuffing box originally constructed for soft packings only, with minimum space required. In intervals of service the semi-circular sleeve members 1, 2 may be removed from the pressure cylinder within a minimum length of time, opened, and checked as to defective packing rings 4. Also the pair of semi-circular sleeve members 1, 2 may be mended without separating the piston rod 6 from its normal fastening members or removing the piston, should the packing rings 4 after a protracted period of service have caused a depression in the semi-circular sleeve member, in the direction of the movement of the rods, while with the previous packings of this type the piston rod always had to be dismantled.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. A stuffing box comprising a box portion, a packing disposed in said box portion, a pair of semi-circular sleeve members in said box portion and enclosing the packing, the opposite ends of said sleeve members being formed each with male thread and with a tapered surface inwardly of said thread, annular nut members threadably engaged with the male threads on each end, each nut member being provided with an internal complementary tapered surface, for engaging one of said tapered surfaces on said sleeve members and compressing said sleeve members into edge to edge engagement and cooperating means on said box portion and said sleeves for holding them against relative endwise movement.

2. A stuffing box comprising a box portion, a packing disposed in said box portion, a pair of semi-circular sleeve members in said box portion and enclosing the packing, the opposite ends of said sleeve members being formed each with male thread and with a tapered surface inwardly of said thread, centering pins in said semi-circular sleeve members for positioning them relatively, annular nut members threadably engaged with the male threads on each end, each nut member being provided with an internal complementary tapered surface for engaging one of said tapered surfaces on said sleeve members and compressing said sleeve members into edge to edge engagement and cooperating means on said box portion and said sleeves for holding them against relative endwise movement.

3. A stuffing box comprising a box portion having inner and outer ends and a threaded portion thereon adjacent to said outer end, a packing disposed in said box portion, a pair of semi-circular sleeve members in said box portion and enclosing the packing, the opposite ends of said sleeve members being formed each with male thread and with a tapered surface inwardly of said thread, said sleeve members being provided with an annular flange, said flange being adapted to overlie the outer end of the box portion of the stuffing box, a resilient packing interposed between said outer end and said flange, a cap nut engaging said thread on said box portion and embracing the annular flange for securing the semi-circular sleeve members in the box portion, and annular nut members threadably engaged with the male threads on each end and each of said nut members having an internal tapered surface complemental to the corresponding tapered surface on the sleeve members for compressing said semi-circular sleeve members.

4. The stuffing box set forth in claim 1 comprising partitions extending inwardly from said sleeve members dividing them into at least two chambers, said packing being disposed in said chambers and comprising a plurality of packing rings.

5. The stuffing box set forth in claim 1 comprising partitions extending inwardly from said sleeve members dividing them into at least two chambers, said packing being disposed in said chambers and comprising a plurality of packing rings, axially slidable pressure rings and compression springs urging said pressure rings against said packing rings.

References Cited in the file of this patent

UNITED STATES PATENTS

| | | |
|---|---|---|
| 674,325 | Walker | May 14, 1901 |
| 721,710 | Lewis et al. | Mar. 3, 1903 |
| 722,269 | Walters | Mar. 10, 1903 |
| 725,368 | Rollins | Apr. 14, 1903 |
| 798,199 | Mason | Aug. 29, 1905 |
| 1,848,328 | Durham | Mar. 8, 1932 |

FOREIGN PATENTS

| | | |
|---|---|---|
| 4,003 | Great Britain | Feb. 25, 1901 |